United States Patent

[11] 3,587,213

| [72] | Inventors | Simon Tamny<br>Los Angeles;<br>James B. Tyler, Chino, Calif. |
|------|-----------|---|
| [21] | Appl. No. | 20,487 |
| [22] | Filed | Mar. 26, 1970 |
| [45] | Patented | June 28, 1971 |
| [73] | Assignee | Wayne Manufacturing Company, Pomona, Calif.<br>Continuation of application Ser. No. 790,491, Sept. 10, 1968, now abandoned. |

[54] STREET SWEEPER FILTER CLEANING SYSTEM
5 Claims, 7 Drawing Figs.

[52] U.S. Cl. .................................................. 55/300,
15/340, 55/304
[51] Int. Cl. ............................................... B01d 46/04
[50] Field of Search ........................................ 15/340;
55/304, 305, 300

[56] References Cited
UNITED STATES PATENTS

| 1,818,736 | 8/1931 | Moore | 55/304 |
| 2,453,951 | 11/1948 | Vedder | 55/304 |
| 1,286,458 | 12/1918 | Warren | 55/300 |
| 1,868,876 | 7/1932 | Boesger | 55/300 |
| 2,196,839 | 4/1940 | Seng | 55/300 |
| 3,173,777 | 3/1965 | Tamny | 55/341 |
| 3,186,021 | 6/1965 | Krier et al. | 55/340 |
| 3,321,892 | 5/1967 | Saint Jacques | 55/299 |
| 3,343,342 | 9/1967 | Du Rocher | 55/299 |

FOREIGN PATENTS

| 640,696 | 5/1962 | Canada | 55/300 |

*Primary Examiner*—Frank W. Lutter
*Assistant Examiner*—Bernard Nozick
*Attorney*—White and Haefliger

ABSTRACT: A shaker mechanism for vibrating street sweeper air filters to remove dirt accumulations from their surfaces, the invention providing particularly a hydraulically driven enclosed eccentric force generating mechanism and a shaker component receivable between filter cells and operable within limited displacement range to produce impact limited resonant vibration of the cells.

PATENTED JUN28 1971 3,587,213

INVENTORS.
SIMON TAMNY
JAMES B. TYLER
By White & Haefliger
ATTORNEYS.

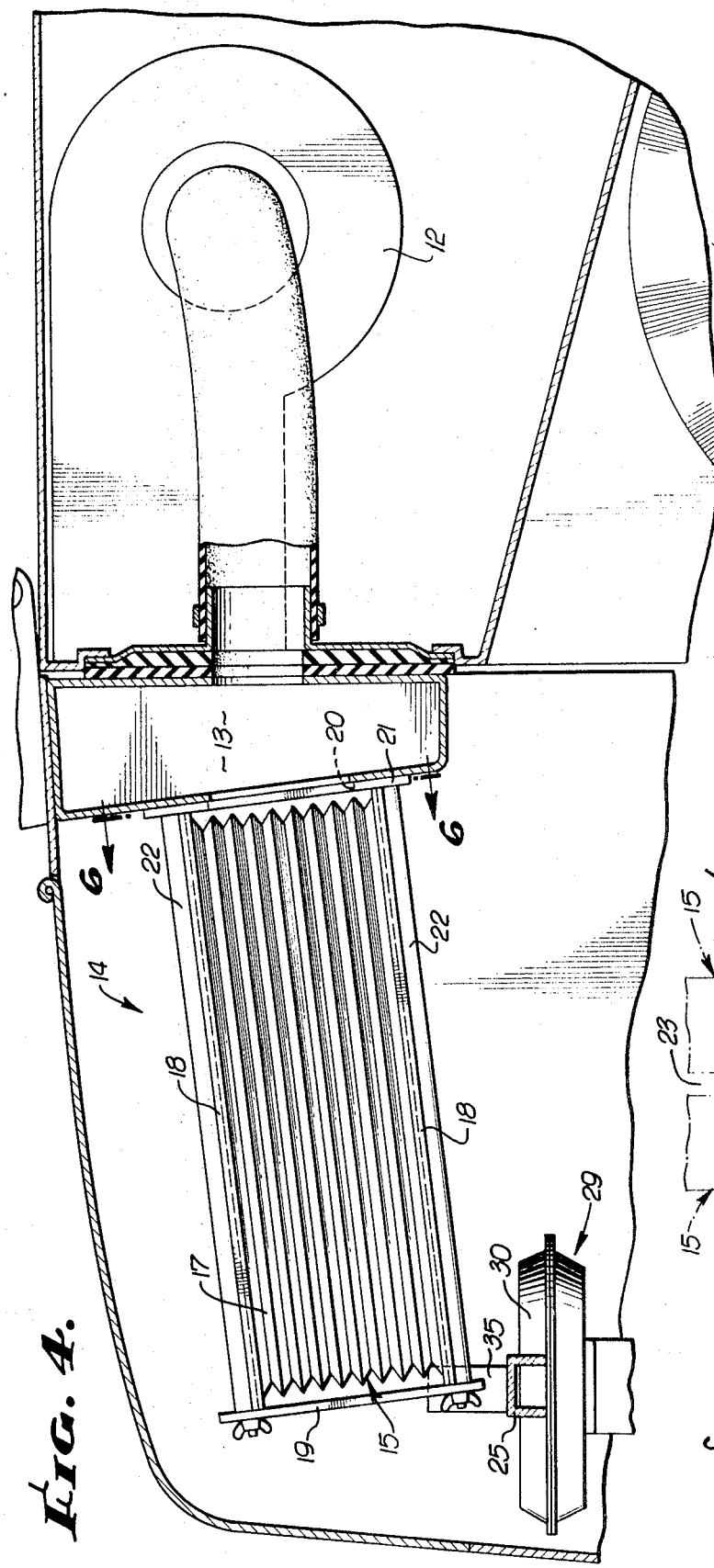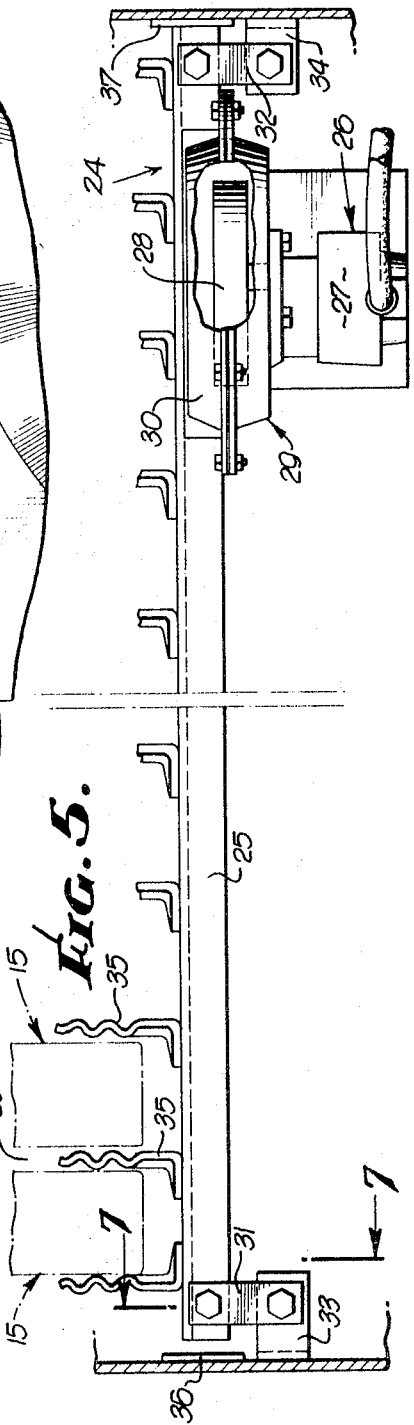

STREET SWEEPER FILTER CLEANING SYSTEM

This application is a continuation of Ser. No. 790,491 filed Sept. 10, 1968 now abandoned.

BACKGROUND OF THE INVENTION

Street sweepers commonly are constructed and operated to provide for dirt or dust removal from airflow through a debris hopper or chamber containing an assemblage of filter components through which passage of the air is induced to leave dirt residues as accumulations on the filter surfaces.

Such accumulations require removal from time to time for maintenance of filter effectiveness and efficiency, and in the past such removal has been variously undertaken by such expedients as airflow reversal and mechanical manipulations of the filter.

FEATURES AND OBJECTS OF THE PRESENT INVENTION

This invention is directed to vibratory cleaning of street sweeper filters by a novel shaker mechanism having particular applicability to an assemblage of air permeable filter cells accommodated within a sweeper chamber so as to be capable of vibration in response to the shaker mechanism which also is contained within the chamber.

While capable of different specific forms and constructions, the filter cells may be rendered inherently responsive to effective dirt removal vibration by constructing the cells of resilient metal frames carrying air permeable fabric or other sheet material, the frames being capable of transmitting vibration to the permeable material at frequencies and amplitudes leading to maximum cleaning efficiency.

Particularly contemplated by the invention is a novel shaker mechanism having important practical advantages in being protected against excessive wear and malfunctioning in its dirt chamber environment. In achieving this objective we employ a hydraulically powered inertial drive comprising a motor and eccentric rotor fully enclosed from dirt exposure and mounted for bodily impact limited reciprocating vibration in association with the filter assembly.

The cellular filter configuration adapts to a simple and effective relation with a filter actuator component of the shaker mechanism in the form of a longitudinally reciprocated bar carrying projections receivable between the cells.

A further feature is one of such limitation upon the shaker bar travel as will permit most efficient correlation with natural vibrative periodicity of the filter cells while maintaining constancy in the bar travel range. Briefly stated, such constancy, permissive of other variables, is maintained by providing for shaker bar impact against a relatively stationary abutment which may be the dirt chamber wall.

The features outlined in the foregoing, as well as additional objects and details will be understood more fully from the following description of an illustrative embodiment of the invention shown by the accompanying drawings, in which:

BRIEF DESCRIPTION OF THE DRAWINGS

FIG. 4 is a fragmentary section taken on line 4–4 of FIG. 3;

FIG. 5 is a view showing the shaker bar and vibrator assembly;

DESCRIPTION OF THE PREFERRED EMBODIMENTS

Figure 1:
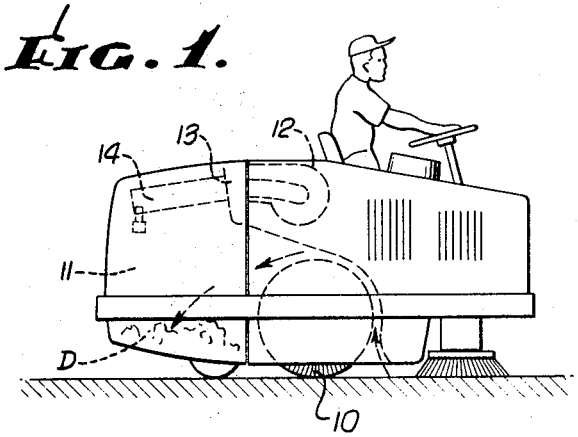
FIG. 1 is a view showing an illustrative power driven sweeper embodying the invention.
Figure 6:
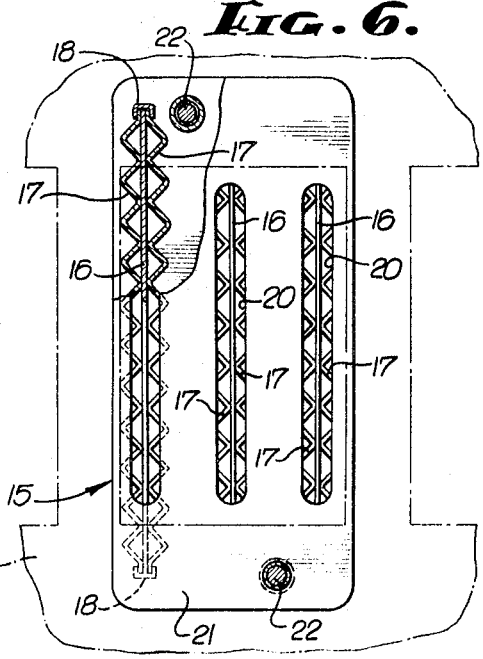
FIG. 6 is a fragmentary section on line 6–6 of FIG. 4 showing an individual filter cell in association with the manifold.

In reference to the general showing of FIG. 1, the invention is applicable to the typical powered sweeper there illustrated and in which debris D is swept by rotating brush 10 into a hopper or chamber 11 associated with a suction blower 12 operating to induce airflow through manifold 13 and an assembly of filter cells 14 for dust separation from the air upstream from the blower. Thus dust tends to deposit and accumulate on the filter surfaces and it becomes necessary from time to time to remove such accumulations.

As previously indicated, the filter assembly 14, or the individual filter units, may have any of various specific forms and constructions although the invention particularly contemplates an assemblage of cellular filter elements capable of cantilevered support or suspension from the manifold 13 to gain important advantages in relationships between the cell assembly and the shaker mechanism, all as will presently appear.

Figure 2:
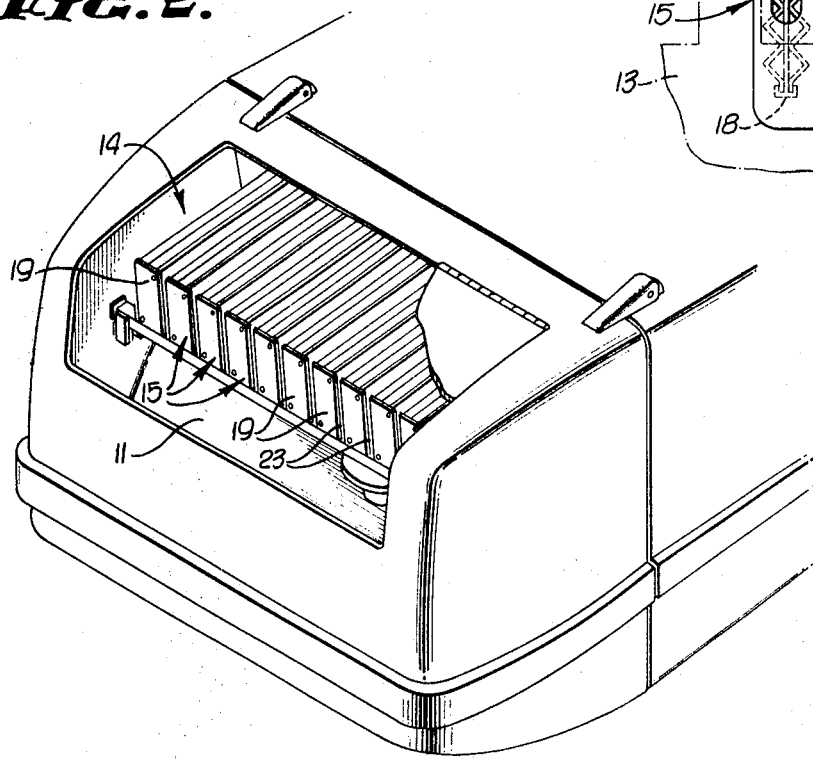
FIG. 2 shows in perspective the filter chamber with cover removed.
Figure 7:
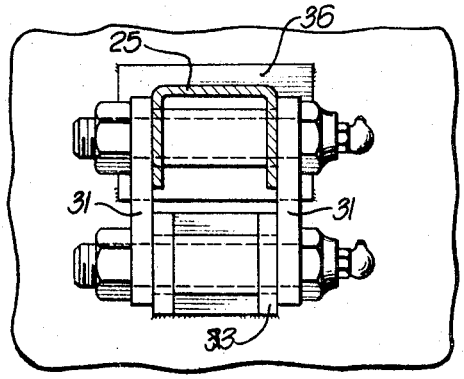
FIG. 7 is an enlarged fragmentary section taken on line 7–7 of FIG. 5 to illustrate one of the oscillatory shaker bar mounts.
Figure 3:
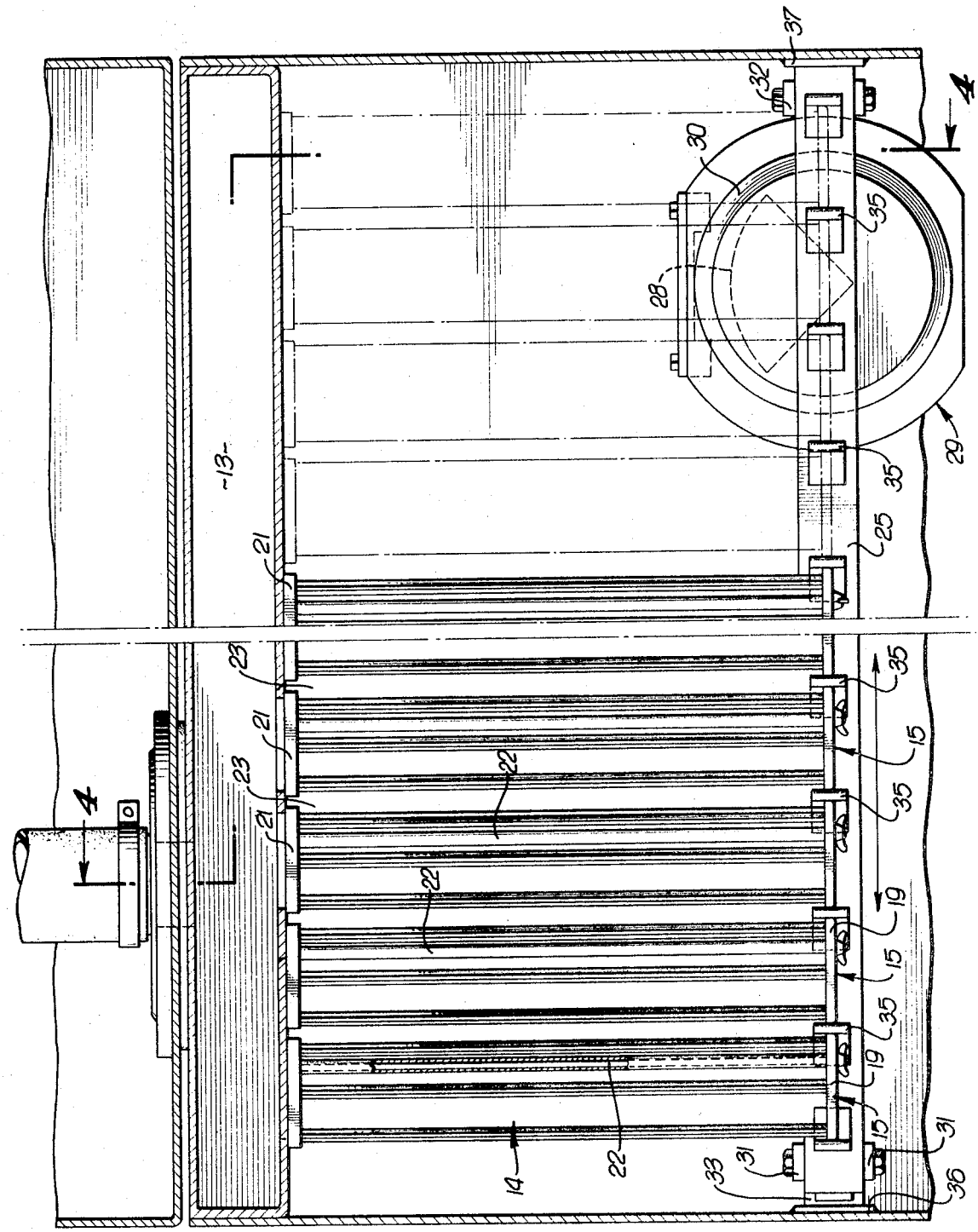
FIG. 3 is an enlarged cross-sectional showing of the filter chamber with its contained manifold-supported filter cells.

Accordingly, in a typical though preferred form the assembly 14 is shown to comprise a series of individually spaced cells 15 each comprising a plurality, typically three, of metallic dividers 16 to which are applied corrugated porous sheet filtering material components 17 the edges of which are crimped at 18 to the dividers. At their exposed ends appearing in FIG. 2, the components are closed to the dividers, and each three element cell is retained by a plate 19, and at their opposite ends the interiors of the components contiguous with the volumes within the corrugations 17, communicate with the suction manifold 13 through slots 20 in plates 21 secured with plates 19 to the manifold by tie bolts 22. Thus the cells have spacings at 23 and individually are manifold-supported for separate replacement as may be required.

Inherently, and particularly by reason of their cantilevered mounting to the suction manifold, the filter cells have the capacity for simple mechanical excitation to different states of lateral vibration and deflections of the dividers 16. Advantage is taken of this inherency of the cells to partially or totally serve the purpose of removing their surface dirt accumulations, by providing for lateral vibration of the cells induced at their free ends using a power source also having vibrating characteristics and whose vibration frequency may be so matched to that of the cell assembly as to produce cell motions of maximum intensity and surface dirt disturbances.

For the cell vibration we employ a shaker mechanism generally indicated at 24 and shown in FIG. 5 to comprise a longitudinally reciprocating bar 25 having a power source 26 importantly characterized by complete enclosure of its moving parts from exposure to the dirt chamber debris and any opportunity for the debris to damage the shaker. The power source 26 is shown to comprise a hydraulic motor 27 which drives an eccentric rotor 28 fully enclosed within the housing 29, the unitized motor and housing assembly being rigidly mounted by the upper portion of the housing 30 to the shaker bar 25. The latter is suitably mounted for limited reciprocation as by means of parallel pivoted links 31 and 32 supported by brackets 33, 34 from the dirt chamber wall.

Bar 25 carries a series of fingers 35 received within the intercell spaces 23, the fingers preferably having the crimped configurations shown in FIG. 5 so as to substantially fill the spaces. The reciprocating range of the bar is limited by providing for its terminal engagements with stationary abutments 36 and 37 on the dirt chamber wall.

At such times as excessive pressure drops through the filter assembly occur as a result of dirt accumulations on the filter cells, the hydraulic motor-eccentric shaker drive is started to reciprocate the bar 25 and through its fingers 35 the filter cells 15, individually and collectively. By reason of the bar stroke limitation (through impact against the chamber wall) what may be termed the amplitude of the shaker mechanism remains constant. However, its frequency is variable in accordance with the hydraulic fluid flow to the motor. Accordingly the shaker frequency is controllable to achieve substantially matched relation with the resonant frequencies of the filter cells and resulting filtering material component vibrations of maximized intensities which produce such disturbances of the cell surface dirt as to assure its removal within a short period of the shaker operation. The shaker frequency may be preestablished by design or variable in operation to achieve said desired matched relation.

We claim:

1. A street sweeping vehicle comprising:
   A. a chamber receptive of swept dirt;
   B. filter structure within the chamber comprising an assemblage of hollow filter elements each having a peripheral sidewall closed at one end and formed of air permeable material exposed to outer surface dirt accumulations from filtered airflow into the filter elements;
   C. a manifold means communicating suction to the interior of the filter elements at their opposite open ends and supporting the elements in cantilevered relation;
   D. elongated laterally resilient dividers inside and secured to said filter elements and said filter elements being carried by the manifold for vibratory movement; and
   E. motor driven shaker mechanism extending within the chamber and into proximity with the filter elements and including means to laterally vibrate said filter elements and dividers and free said dirt accumulations from the element surfaces, said mechanism being reciprocally driven by a hydraulic motor exposed to dirt shaken from the filter elements and containing an enclosed eccentric rotor, there being housing structure for the motor and rotor connected with said mechanism to vibrate laterally therewith, said housing structure being within said chamber and substantially completely enclosing said rotor and motor.

2. A vehicle according to claim 1, in which the reciprocating range of said shaker mechanism E is limited by its impact against a relatively stationary portion of the chamber.

3. A vehicle according to claim 1, in which said elements one ends are closed by plates and said shaker mechanism includes a bar, said means defining projections received within spacings between the filter elements and impactable in force transmitting relation with the elements.

4. A vehicle according to claim 3, in which the reciprocating range of said bar is limited by impact against a relatively stationary portion of the chamber.

5. A vehicle according to claim 4, in which said bar is supported by a pair of oscillatory members connecting the bar with the chamber wall.